United States Patent
Margonis et al.

(10) Patent No.: US 8,306,884 B2
(45) Date of Patent: Nov. 6, 2012

(54) MANAGEMENT OF VOLUMETRIC PRODUCT DELIVERY

(75) Inventors: Elias Margonis, Houston, TX (US);
Charles N. Harper, Houston, TX (US)

(73) Assignee: Air Liquide Industrial U.S. LP, Houston, TX (US)

( * ) Notice: Subject to any disclaimer, the term of this patent is extended or adjusted under 35 U.S.C. 154(b) by 0 days.

(21) Appl. No.: 12/902,549

(22) Filed: Oct. 12, 2010

(65) Prior Publication Data

US 2011/0137777 A1    Jun. 9, 2011

Related U.S. Application Data

(60) Provisional application No. 61/285,132, filed on Dec. 9, 2009.

(51) Int. Cl.
*G06Q 10/00* (2012.01)
(52) U.S. Cl. .......................................................... 705/34
(58) Field of Classification Search ................... 340/870
See application file for complete search history.

(56) References Cited

U.S. PATENT DOCUMENTS 5,565,862 A * 10/1996 Hubbard et al. ......... 340/870.11
* cited by examiner

*Primary Examiner* — Shay S Glass
(74) *Attorney, Agent, or Firm* — Elwood L. Haynes

(57) ABSTRACT

A billing system for supply contrasts in an industrial network is disclosed. In the case of a pipeline, a process flow computer installed at each customer site may each receive instantaneous flow readings from a flow meter. The process flow computer may be configured to accumulate product volumes in different volume groups, where each volume group corresponds to a range of instantaneous flow rates. Different volume groups may be associated with different rates ultimately charged to a customer. The volume groups may be assigned by a computing system running a billing application at a pipeline operations control center. Volume groups may be set for individual customers based on a contract summary of an agreement between a given customer and the operator of an industrial network.

21 Claims, 7 Drawing Sheets

MANAGEMENT OF VOLUMETRIC PRODUCT DELIVERY

CROSS-REFERENCE TO RELATED APPLICATION

This application claims benefit of U.S. Provisional Patent Application Ser. No. 61/285,132 filed Dec. 9, 2009, which is incorporated herein by reference.

BACKGROUND

Generally, a pipeline system provides a continuous pipe conduit that includes a variety of components and equipment, e.g., valves, compressor stations, communications systems, and meters. A pipeline may be used to transport liquid or gaseous materials from one point to another, usually from one point (or points) of production or processing to another, or to points of use. That is, from a producer of product delivered through the pipeline to customers. For example, an air separation unit may be used to separate atmospheric air into gaseous components (e.g., oxygen gas ($O_2$), nitrogen gas ($N_2$), Argon gas (Ar), etc.) delivered to a variety of customers at downstream points along a pipeline. Similarly, hydrogen gas ($H_2$) may be generated using a steam-methane reformer or other reformation processes. At compressor stations, compressors maintain the pressure of the material in the pipeline as it is transported. Similarly, for a liquid bearing pipeline, pumps may be used to introduce and maintain pressure for a liquid substance transported by the pipeline.

Running and maintaining a pipeline system can be expensive and complex, and the operations of a pipeline system are frequently coordinated and controlled from a central operations control center. At such a control center, an operator may monitor process data related to the operational state of the pipeline and each of its constituent elements using a SCADA (Supervisory Control and Data Acquisition) system. Other complex industrial systems and processes use a similar approach. For example, a petroleum refinery (at one end of a pipeline) may be monitored from a central control center using a real-time status database configured to receive data collected from the field devices of the refinery. Similarly, electrical generation facilities, chemical production or processing facilities, steel mills, manufacturing plants, assembly lines, etc., are frequently monitored using a centralized operations control center.

In addition to the complexity of these types of large industrial operations, an operator needs to monitor how much product is delivered to any given customer for purposes of billing. For example, a pipeline operator may have customers each with a distinct set of contractual requirements that affect how much the pipeline operator may charge, e.g., for minimum volume delivery, price points for different instantaneous flow rates, force majeure requirements, pass through requirements (what costs of production are passed on to the customer), and price adjustments, etc.

SUMMARY

Embodiments of the invention provide techniques for billing customers taking product from a large industrial network, such as a pipeline. One embodiment of the invention includes a method for generating billing data for a supply contract in a monitored industrial network. The method may generally include identifying one or more volumetric accumulation groups for a process flow device at a customer site. The customer site receives product delivered through the monitored industrial network pursuant to the supply contract. The method may also include transmitting the volumetric accumulation groups to the process flow device. The process flow device itself may be configured to receive, from a flow meter, a volume of product delivered to the customer site, relative to a sampling frequency specified for the flow meter and accumulate volume amounts in one or more of the volumetric accumulation groups based on the flow rate received from the flow meter and the sampling frequency. The method may further include receiving, from the process flow device, the accumulated volume for each of the volumetric accumulation groups.

In a particular embodiment, the monitored industrial network is a pipeline. In such a case, the flow meter may measure an instantaneous flow of product delivered over the pipeline to the customer site and each volumetric accumulation group may correspond to a range of instantaneous flow rates. The volumetric accumulation groups may be derived from the supply contract.

BRIEF DESCRIPTION OF THE DRAWINGS

For a further understanding of the nature and objects of the present invention, reference should be made to the following detailed description, taken in conjunction with the accompanying drawings, in which like elements are given the same or analogous reference numbers and wherein.

DESCRIPTION OF PREFERRED EMBODIMENTS

Figure 1:
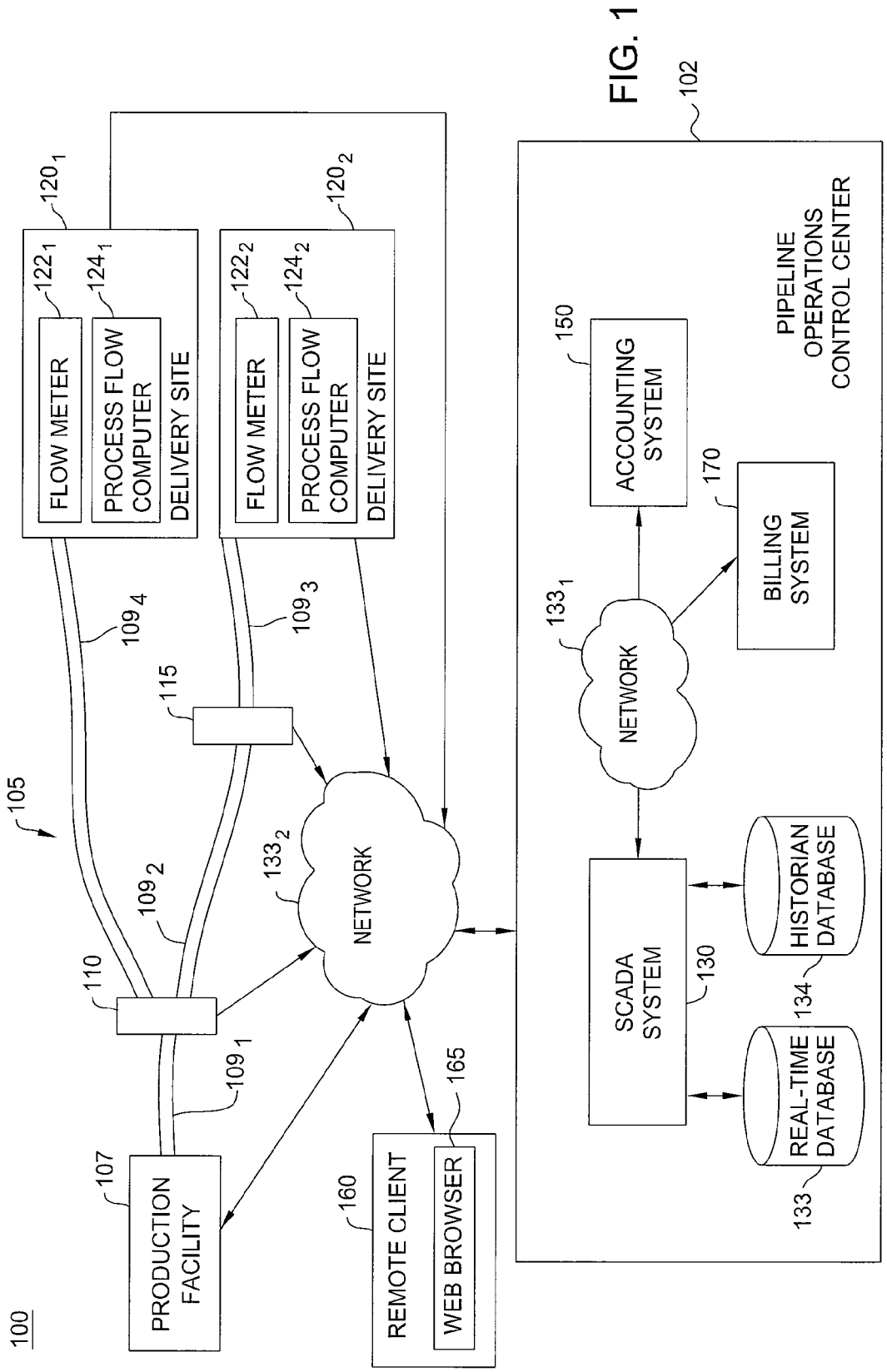
FIG. 1 is an illustration of a monitored pipeline and an operations control center, according to one embodiment of the invention.

Embodiments of the invention include a billing system for supply contracts in an industrial network. In the context of a pipeline system, for example, a process flow computer installed at each customer site may receive instantaneous flow readings from a flow meter. The flow meter measures how much product volume a customer pulls from a pipeline at a given point in time, e.g., second-by-second, and sends this information to the process flow computer. By measuring at frequent intervals, the flow meter may capture short-lasting, but high peaks of instantaneous product flow which are otherwise lost when flow rates are sampled less frequently. In cases where a rate charged to a customer depends on flow rate, this allows the pipeline operator to more accurately determine how much volume is being delivered at different flow rates. The process flow computer may be configured to accumulate product volumes in different volume groups, where each volume group corresponds to a range of instantaneous flow rates. Different volume groups may be associated with different rates ultimately charged to a customer. For example, a customer could be charged $X per unit for taking product at a first volumetric rate and $Y per unit for taking product at a second volumetric rate.

In one embodiment, the volume groups are assigned by a computing system running a billing application at a pipeline operations control center. The billing application may have access to both the particular contract requirements associated with a given customer as well as external events that may relate to the volume groups assigned to the process flow computer at a given customer site. For example, a contract may allow an operator to set volume groups based on a variety of external factors (e.g., the price of electricity) or on a then-current value of various indexes. The billing application uses these factors to set the volume groups for a given customer. Thus, volume groups are set for individual customers based on the contractual arrangement between a given customer and the pipeline operator.

Further, the volume groups may be dynamic. For example, in the event of a major weather event, a contract may change how volumes should be accumulated at a customer site. Similarly, a customer may have a take-or-pay minimum volume during a billing period. In such a case, the process flow computer might accumulate volume in a single group representing the take-or-pay minimum. Once the minimum volume is reached, the billing application may send a new set of volume groups to the process flow meter at that particular customer site. The updated volume groups would be based on whatever contractual terms are specified for volumes that exceed the take-or-pay minimum and any relevant prevailing conditions (e.g., a market index for electricity purchases), as determined by the billing system at the operations control center.

The process flow computer may periodically transmit the accumulated volumes from a given customer site to a pipeline operations control center, where such data may be stored by a SCADA system. In one embodiment, the SCADA system may provide a real-time status database (which reflects the current process data of the industrial system) and a historian database (which archives the process data from the industrial system as it changes over time). For example, the real-time database may provide the most recent volumetric accumulations received from the process flow computer at each customer site. Similarly, the historical database may include each volumetric accumulations previously received from the process flow computers. In one embodiment, the billing application may use the data stored in the SCADA system to determine an invoice amount for any desired period. A set of billing variables (representing pass through amounts and price adjustments that depend on external factors) may be used along with the product volumes accumulated in each volume group to arrive at an invoice amount for a particular period. Thus, the billing application allows the pipeline operator to construct invoices based on near real-time volume accumulations as well as any external value specified in a particular customer agreement.

Additionally, the billing application may allow the operator to add new agreements (or updated an agreement) managed by the billing application, process flow computers, and flow meters. Further, the billing application may allow the operator to make any desired manual adjustments to any of the factors used to arrive at an invoice amount (or simply update an invoice amount). Further still, the billing application may report out data to an accounting system (e.g., an accounts receivable system and/or a general ledger)—allowing other business units with access to information captured by the process flow computers and flow meters, stored in the SCADA system, and processed by the billing application. Data from the various computing systems may also be periodically transmitted to a data warehouse offsite to the operations control center.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified herein.

A particular embodiment of the invention is described using a pipeline as an example of a large industrial operation managed using the billing application and systems described herein. However, it should be understood that the invention may be adapted for use with a broad variety of industrial systems with complex billing requirements including, e.g., electrical generation facilities, chemical production or processing facilities, steel mills, manufacturing plants, assembly lines, etc. Accordingly, references to a pipeline system are merely illustrative and not limiting.

FIG. 1 is an illustration of a system 100 that includes a monitored pipeline 105 and an operations control center 102, according to one embodiment of the invention. As shown, a pipeline 105 connects a production/processing facility 107 and two product delivery sites $120_{1-2}$. Production facility 107 may represent, for example, a molecular gas generation plant that includes one or more air separation units used to purify gaseous substances from the ambient atmosphere. The resulting product is delivered to stations $120_{1-2}$ over the pipeline 105. Illustratively, pipeline 105 includes pipeline segments $109_{1-4}$. Pipeline segments $109_1$, $109_2$, and $109_3$, provide a path from production facility 107 to delivery site $120_2$ and pipeline segments $109_1$ and $109_4$ provide a path from production facility 107 to delivery station $120_1$. Additionally, pipeline 105 includes compressor stations 110 and 120 used to maintain the pressure of gaseous substances as it is transported over pipeline 105 from the production facility 107 to the delivery sites $120_{1-2}$.

Compressor stations 110 and 115 may include sensor equipment used to monitor aspects of the operational state of the pipeline 105. For a pressurized gas pipeline, for example, a wide variety of field devices and parameters may be monitored including, for example, inlet gas pressure, outlet gas pressure, gas temperature, cooling liquid temperature, flow rates, and power consumption, among others. Similarly, the operational state of various field devices, air separation units, and equipment at production facility 107 and delivery stations $120_{1-2}$ may be monitored by sensor equipment. Of course, for other industrial networks and systems, the sensors and monitoring equipment may be selected to suit the needs of a particular case. Illustratively, delivery sites $120_{1-2}$ each include a respective flow meter $122_{1-2}$ and a process flow computer $124_{1-2}$. In one embodiment, the flow meters $122_{1-2}$ may be configured to sample the instantaneous flow rates of product taken from the pipeline 105 by the delivery stations $120_{1-2}$, at a specified interval (e.g., once every second). The instantaneous flow rates may be transmitted to the respective process flow computer $124_{1-2}$. In turn, the process flow computer $124_{1-2}$ receives the sampled flow rate and updates the volume accumulated in one or more volume groups. Each volume group may generally correspond to a range of instantaneous flow rates. That is, the process flow computer 124 may update an accumulation of volume in a volume group based on an amount of volume taken by the customer at the sampled instantaneous flow rate for the sampling period.

In one embodiment, the volumes accumulated by the process flow computer 124 may be transmitted to the operation control center 102 over network $133_2$ at periodic intervals, e.g., once an hour. Sensors at a variety of points in the pipeline 105 may also transmit information regarding the operational state of pipeline 105 to the operation control center 102 over network $133_2$, as represented by the arrows connecting the production facility 107, compressor stations 110 and 115, and delivery sites $120_{1-2}$ to network $133_2$. The pipeline operation control center 102 may employ a number of computer systems running application programs used to coordinate, monitor, and control the operations of pipeline 105, including a billing system 170 configured to manage billing for product volumes delivered to customers at the delivery sites $120_{1-2}$.

Illustratively, the pipeline operations control center 102 includes a SCADA (Supervisory Control and Data Acquisition) system 130, a real-time database 133 and a historian database 134 an accounting system 150, and the billing system 170, each communicating over a network $133_1$. Additionally, a computing system may provide a remote interface to the computing systems at the operations control center 102. Thus, as shown, the remote client 160 communicates over network $133_1$ with the computer systems of the operations control center 102. For example, a user may interact with a web-browser 165 to access SCADA data over the network $133_1$. The computer systems 130, 133, 134, 150, 160 and 170 are included to be representative of existing computer systems, e.g., desktop computers, server computers, laptop computers, tablet computers and the like. However, embodiments of the invention are not limited to any particular computing system, application, device, architecture or network, and instead, may be adapted to take advantage of new computing systems and platforms as they become available. Additionally, one skilled in the art will recognize that the illustrations of computer systems 130, 133, 134, 150, 160 and 170 are simplified to highlight aspects of the present invention and that computing systems and networks typically include a variety of components not shown in FIG. 1.

In one embodiment, the SCADA 130 system is configured to gather data in real-time from sensors on the pipeline 105 and the process flow computers $124_{1-2}$ at the delivery sites $120_{1-2}$ in order to control equipment and monitor conditions in the pipeline 105. As noted above, e.g., in context of this disclosure, the SCADA system 130 may receive volumetric accumulations of product taken at delivery sites $120_{1-2}$, sorted by volume group. The monitored data may be stored in real-time database 133. The real-time database 133 generally stores the last known value for each element of element or component of an industrial system (e.g., pipeline 105) monitored using system 100. That is, the real-time database 133 may store data values each representing a monitored parameter of pipeline 105 and the current operational value of that parameter (e.g., the most recent volumetric accumulation data received from process flow computers $124_{1-2}$). The data may be written into real-time database 133 periodically, where values are updated at regular intervals, or exception based, where a new values are written into real-time database 133 only when the monitored value changes more than a predetermined value. In turn, the billing system 170 may use the volumetric accumulation data to compute an invoice value for a given customer, based on the accumulated volumes, external factors (e.g., pass through amounts such as the cost of electricity), and on any billing adjustments specified in an agreement between the producer and consumer of product delivered through pipeline 105. The historian database 134 may be configured to retrieve (or receive) the values for monitored parameters from real-time database 133. Thus, the historian database 134 provides an archive of values from the real-time database 133.

Of course, the appearance, behavior, and capabilities of interfaces made available by the billing system 170 may be tailored to suit the needs of a particular case. Further, although SCADA system 130, real-time database 133, historian system 134, accounting system 150, and billing system 170, are shown as separate components, one of ordinary skill in the art will recognize that these components may be applications running on a single computer system, or on multiple computer systems, and further, that these components may be configured in a variety of ways.

Figure 2:
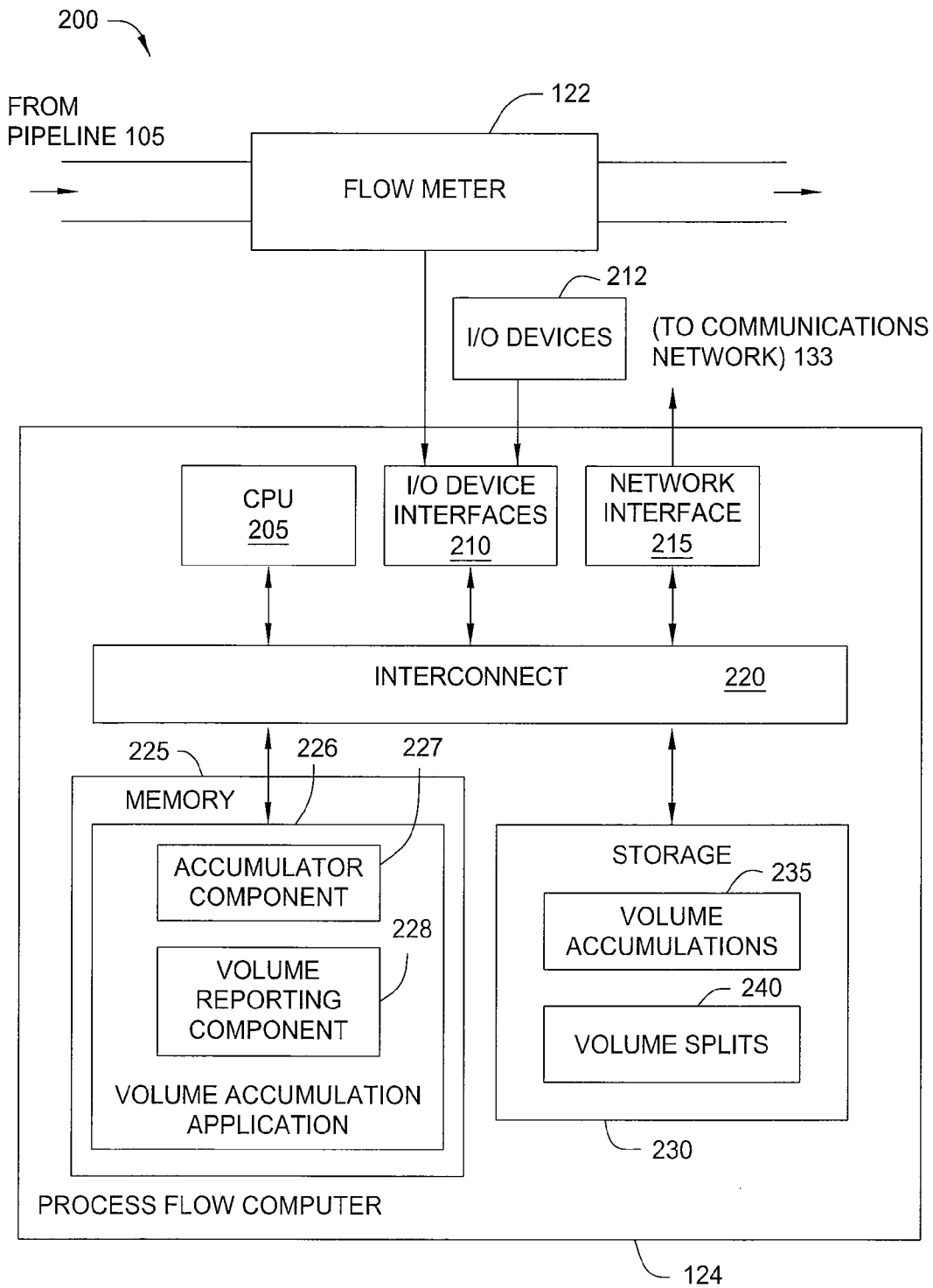
FIG. 2 is a more detailed view of the process follow computer of FIG. 1, according to one embodiment of the invention.

FIG. 2 is a more detailed view of the process flow computer 124 of FIG. 1, according to one embodiment of the invention. As shown, the process flow computer 124 includes, without limitation, a central processing unit (CPU) 205, a network interface 215, an interconnect 220, a memory 225, and storage 230. The process flow computer 124 may also include an I/O device interface 210 connecting I/O devices 212 (e.g., keyboard, display and mouse devices) to the process flow computer 124. Additionally, the flow meter 122 is shown connected to pipeline 105.

In general, the CPU 205 retrieves and executes programming instructions stored in the memory 225. Similarly, the CPU 205 stores and retrieves application data residing in the memory 225. The interconnect 220 facilitates transmission of programming instructions and application data between the CPU 205, I/O devices interface 210, storage 230, network interface 215, and memory 225. CPU 205 is included to be representative of a single CPU, multiple CPUs, a single CPU having multiple processing cores, and the like. And the memory 225 is generally included to be representative of a random access memory. The storage 230 may be a disk drive storage device. Although shown as a single unit, the storage 230 may be a combination of fixed and/or removable storage devices, such as fixed disc drives, floppy disc drives, tape drives, removable memory cards, optical storage, network attached storage (NAS), or a storage area-network (SAN). Additionally, although shown as separate units, the flow meter 122 and process flow computer 124 may be integrated as a single device. Further, for some embodiments, the process flow computer 124 may be a device configured using one or more application-specific integrated circuits (ASICs) (or other specific hardware devices adapted to communicate with the billing system 170) configured to perform the functions described herein.

As noted above, the flow meter 122 may provide a measure of an instantaneous flow rate of product taken from the pipeline 105 at a specified interval. While the particular interval may be tailored to suit the needs of an individual case, in some embodiments, the flow meter 122 may sample the instantaneous flow rate once every second. The resulting volumes determined from the instantaneous flow rates may be used to accumulate volume amounts in multiple volume groups. In one embodiment, volume groups may be set by the process flow computer 124 in response to messaging from the billing system 170 at the pipeline operations control center 102.

Illustratively, the memory 225 includes a volume accumulation application 226, which itself includes an accumulator component 227 and a volume reporting component 228, and storage 230 includes volume accumulations 235 and volume groups 240. In one embodiment, the accumulator component 227 provides a software application configured to receive instantaneous flow rates from the flow meter 122, as well as determine an amount of product volume delivered to a customer for a sampling at a given sampling frequency. For example, a volume amount delivered over a 1-second period, based on the instantaneous flow rate. Further, the accumulator component 227 may determine a volume accumulation 235 to increment with the volume determined from the instantaneous flow rate. In one embodiment, each volume group 240, also commonly referred to as a volume split, defines ranges of instantaneous flow rates. That is, any product volume delivered within the instantaneous flow-rate range of a volume group (or split) is accumulated to that corresponding volume group. Further, the accumulator component 227 may be configured to update the volume groups 240, based on messages received from the operations control center 102. The volume reporting component 228 provides a software application configured to transmit accumulated volumes to the SCADA system 130 at the operations control center 102.

Figure 3:
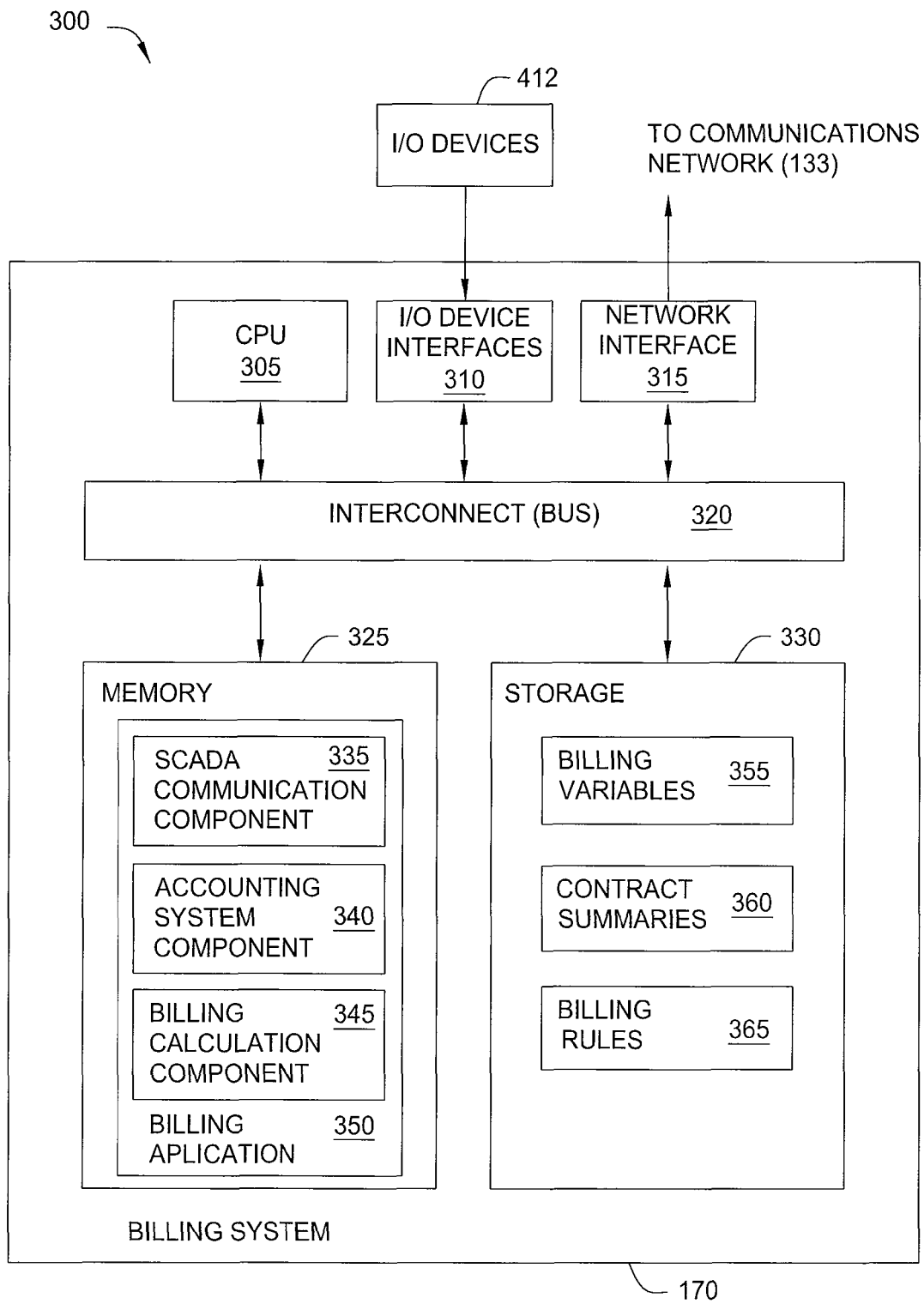
FIG. 3 is a more detailed view of the billing computing system of FIG. 1, according to one embodiment of the invention.

FIG. 3 is a more detailed view of the billing system 170 of FIG. 1, according to one embodiment of the invention. As shown, billing system 170 includes, without limitation, a central processing unit (CPU) 305, a network interface 315, an interconnect 320, and a memory 325. The billing system 170 may also include an I/O device interface 310 connecting I/O derives 412 (e.g., keyboard, display and mouse devices) to the billing system 170.

The CPU 305 is configured to retrieve and execute programming instructions stored in the memory 325 and storage 330. Similarly, the CPU 305 is configured to store and retrieve application data residing in the memory 325 and storage 330. The interconnect 320 is configured to facilitate data transmission, such as programming instructions and application data, between the CPU 305, I/O devices interface 310, storage unit 330, network interface 405, and memory 325. Like the CPU 205 shown in FIG. 2, CPU 305 is included to be representative of a single CPU, multiple CPUs, a single CPU having multiple processing cores, and the like, and memory 325 is generally included to be representative of a random access memory. Storage 330, such as a hard disk drive or flash memory storage drive, may store non-volatile data. The network interface 415 is configured to transmit data via the communications network 133.

As shown, the memory 325 stores programming instructions and data, including a SCADA communication component 335, an accounting system 340, and a billing calculation component 345. Storage 330 stores billing variables 355, contract summaries 360, and billing rules 365. In one embodiment, the SCADA communication component 335 provides a software application, component, or module configured to retrieve volumetric accumulation data (or other information) from the SCADA system 130 as needed to determine an invoice or billing amount for a specified period. As a simple example, assume an agreement with a given customer calls for a billing period to close at the end of each calendar month. In such a case, the billing calculation component 345 may be configured to retrieve the accumulated volumes transmitted from the process flow computer 124 at the given customer delivery site 107 for any given calendar month and use this information, along with a set of billing rules 365 and billing variables 355, to determine an invoice amount for the given customer. In this example, the invoice amount may simply be the accumulated volume times an agreed upon unit price - or the sum of multiple such accumulations in different pricing tiers based on flow rates or volumes. Of course, other amounts such as pass through amounts, or any adjustments based on external factors (e.g., an increase to a base amount after a specified term or an increase based on an external index such as the consumer price index).

In one embodiment, the billing rules 365 may be derived from a contract summary 360 associated with the given customer and specify rules for calculating the invoice amount from the accumulated volumes retrieved from the SCADA system 130 and any relevant billing variables 355. That is, the contract summaries 360 may encapsulate a complete set of billing details relevant for a given customer agreement. For example, terms such as pricing tiers for instantaneous volume flow rates, escalation conditions, fees, minimum take-or-pay amounts, payment terms, cancellation rights, external billing variables, adjustment formulas, late charges, etc. And the billing rules 365 may provide the billing calculation component 345 with a set of declarative rules to apply to elements from the contract summaries 360 to the accumulated volume amounts in order to determine a particular invoice amount. The accounting system 340 may include applications and data used by the pipeline operator—e.g., a business accounts receivable ledger, accounts payable ledger, and general ledger.

Figure 4:
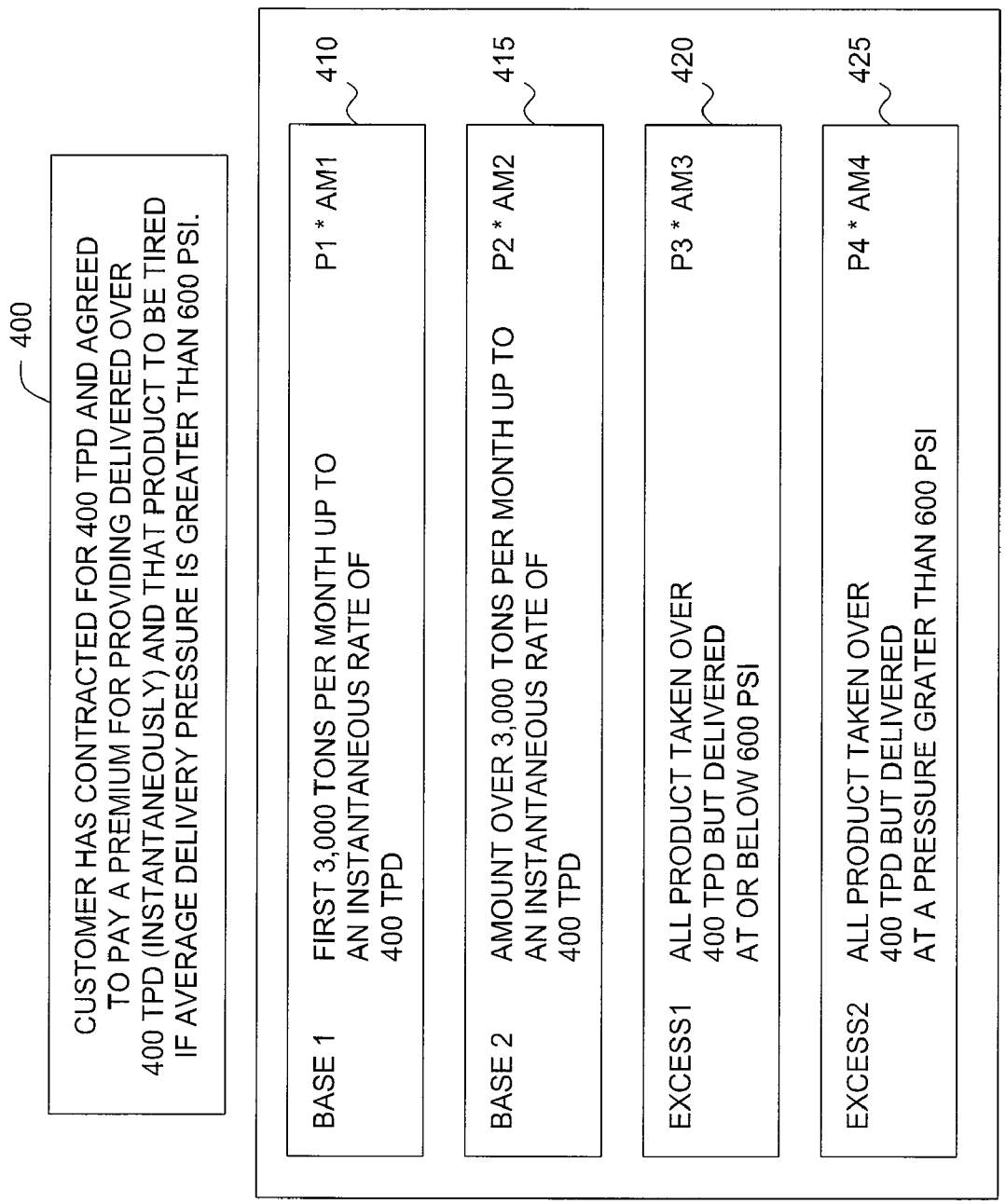
FIG. 4 illustrates an example contract summary and a set of billing rules derived from the contract summary, according to one embodiment of the invention.

FIG. 4 illustrates an example contract summary 400 and a set of billing rules 405 derived from the contract summary 400, according to one embodiment of the invention. In this example, a customer has agreed to a first pricing tier for the first 3000 tons of product per month, when delivered at an instantaneous rate of up to four-hundred tons-per-day (TPD) and agreed to second pricing tier for amounts above the first 3000 tons (also when delivered at an instantaneous rate up to four-hundred TPD). In addition to the two pricing tiers, the customer has agreed to two excess fee amounts: one for product taken above 400 TPD, but delivered at a pressure below 600 PSI and another for product taken above 400 TPD delivered at a pressure above 600 PSI. Thus, the invoicing amount depends not just on an accumulated volume, but the instantaneous flow rates and pressures at which the product is delivered. Of course, any measurable aspect as of product delivery may be encapsulated in a billing rule.

These terms are reflected by the contract summary 400 and implemented in the billing rules 405. Specifically, four billing rules 410, 415, 420 and 425 are used to capture the four different pricing amounts. Billing rule 410 specifies a rule to calculate an invoice amount for the first 3,000 tons of product delivered the pipeline up to an instantaneous flow rate of 400 TPD. That is, an amount equal to P1*AM1 provides an invoice amount for a first pricing tier. Billing rule 415 specifies a rule to calculate an invoice amount for amounts over the first 3,000 tons of product (delivered up to an instantaneous flow rate of 400 TPD). That is, an amount equal to P2*AM2 provides an invoice amount for a second pricing tier.

Rules 420 and 425 specify rules for calculating the excess amounts for product taken at an instantaneous flow rate above 400 TBP. Note, again, this amount may be determined by the flow meter at a customer site sampling instantaneous flow rates, e.g., once per second. Rule 420 provides an invoice amount for product taken over the 400 TPD flow rate, but delivered at a pressure at or below 600 PSI. That is, an amount equal to P3*AM3 provides an invoice amount for the first excess fee. Rule 425 covers the final scenario, where product is taken at a flow rate above 400 TPD and delivered at a pressure exceeding 600 PSI. That is, an amount equal to P4*AM4 provides an invoice amount for the second excess fee.

To calculate an invoice amount, the billing calculation component 345 retrieves the billing rules 410, 415, 420 and 425 applicable to the contract summary 400, and identifies the needed data to retrieve from the SCADA system 130. In the example of FIG. 4, the billing calculation component 345 retrieves the accumulated volumes for three volume groups (over a particular billing period) in order to calculate an invoice amount. Specifically, the billing calculation component 345 determines an invoice amount corresponding to four billing rules from: (i) the total accumulated volume delivered at an instantaneous flow rate below 400 TBD, (ii) the total accumulated volume delivered at an instantaneous flow rate above 400 TBD, but delivered below 600 PSI, (iii) the total accumulated volume delivered at an instantaneous flow rate above 400 TBD, but delivered above 600 PSI and (iv) the pricing amounts agreed to by the customer. The resulting sum of the four invoice amounts provides final invoice amount (over a particular billing period).

Of course, one of ordinary skill in the art will recognize that the example contract summary 400 and the billing rules 405 provide just one example of how billing rules may be constructed for a given contract, and that a broad variety of billing rules based on instantaneous flow rates and other information may be derived from a contract summary for a given customer.

Figure 5:
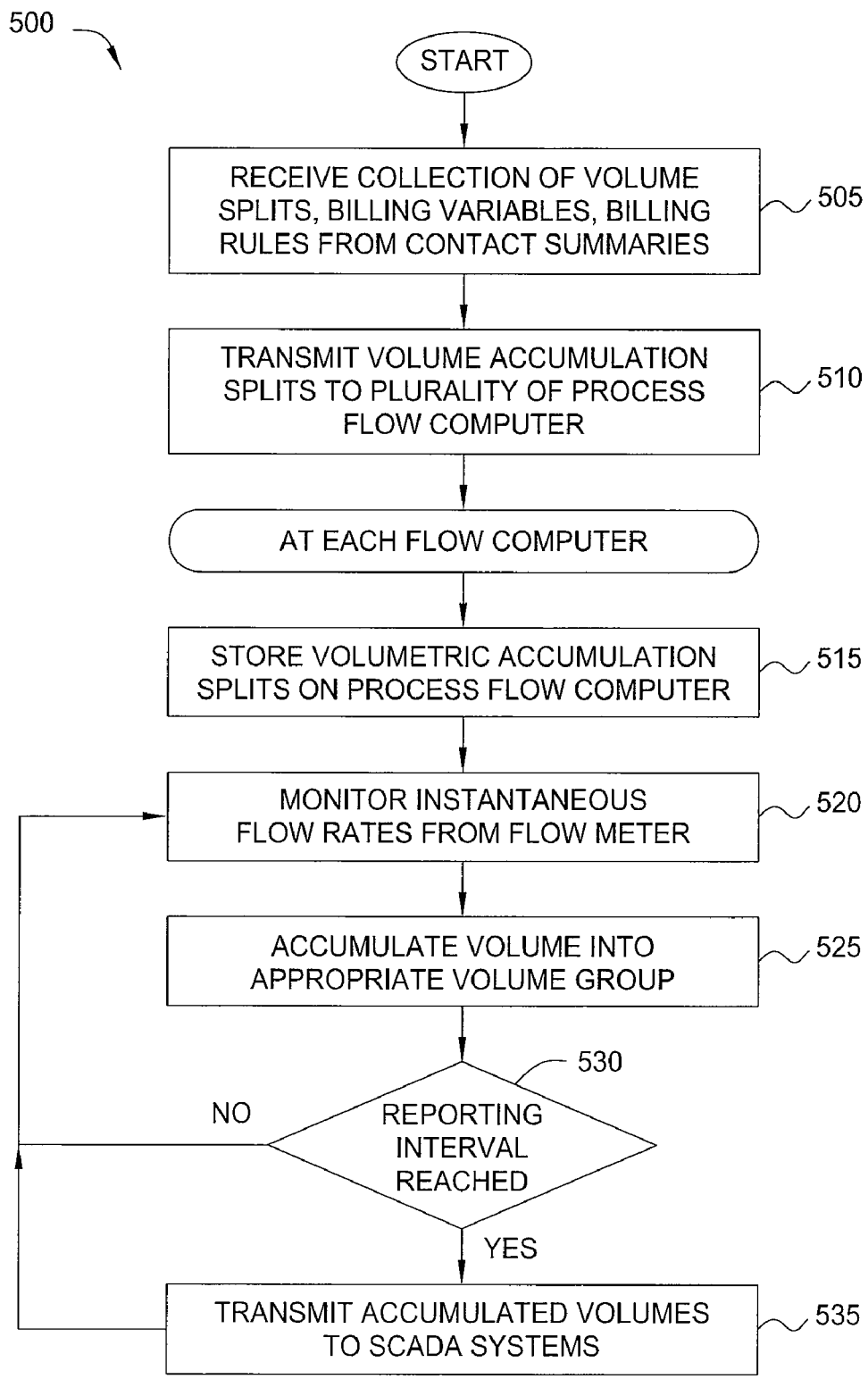
FIG. 5 illustrates a method for accumulating and reporting volumetric billing data related to the operations of an industrial system, such as a pipeline, according to one embodiment of the invention.

FIG. 5 illustrates a method 500 for accumulating and reporting volumetric billing data to a billing system for supply contrasts in an industrial network, such as a pipeline, according to one embodiment of the invention. As shown, the method 500 begins at step 505, where the billing system identifies a contract summary and associated volumetric groups, billing variable, and billing rules for a given customer agreement. In one embodiment, the billing system may be configured to derive this information from a contract summary generated for a particular customer agreement. For example, the contract summary may be composed in a formal language grammar (e.g., an XML grammar) parsed by the billing system to generate the billing rules and billing variables, etc., for a given customer agreement from the contract summary. Of course, in an alternative embodiment, a user may compose the billing rules and related information from a contact summary directly. In either case, as noted above, the billing rules may be used to construct an invoice amount on a per-customer basis using volume accumulations received from a process flow computer at a customer site. Further, the billing system may identify the appropriate volume group for which the process flow computer should, in fact, accumulate volume amounts. Of course, like the billing rules, the volume groups or splits may be specified by a user directly.

At step 510, the billing system transmits the volume groups for each customer to the process flow computer at that customer's site or sites. As noted above, the volume groups may be dynamic. For example, in the event of a major weather event, a contract summary may specify an "exception" set of volumetric accumulation groups to use in place of the "normal" ones derived from a customer agreement. Or as another example, a customer agreement may specify a first set of volume groups for one period (e.g., the first year of the agreement) and a second set of volume groups for another period (e.g., the second year of agreement). Of course, a broad variety of other scenarios for dynamic changes to the volume groups used by a given process flow computer at a customer site are contemplated.

However determined (or re-determined), once the volume groups are provided to the process flow computer at a customer site, the process flow computer begins accumulating volumes based on the flow rates sampled the flow meter. At step 515, the process flow computer at a given customer site stores the volumetric accumulation groups. At step 520, the process flow computer receives an instantaneous flow rate from the flow meter. From this, the process flow computer determines a volume of product delivered to a customer from the sampling frequency of the flow meter (e.g., one second) and accumulates this volume amount in the appropriate volume group (or groups). At step 530, the process flow computer determines whether a reporting interval has been reached. If not, the method 500 returns to step 520, until the process flow computer receives the next sampled instantaneous flow rate from the flow meter. Otherwise, at step 535, the total volume accumulations are reported to the SCADA system at the operations control center. After step 535, the method 500 returns to step 520, where the process flow computer continues to accumulate volumes in the volume groups received from the billing system.

Figure 6:
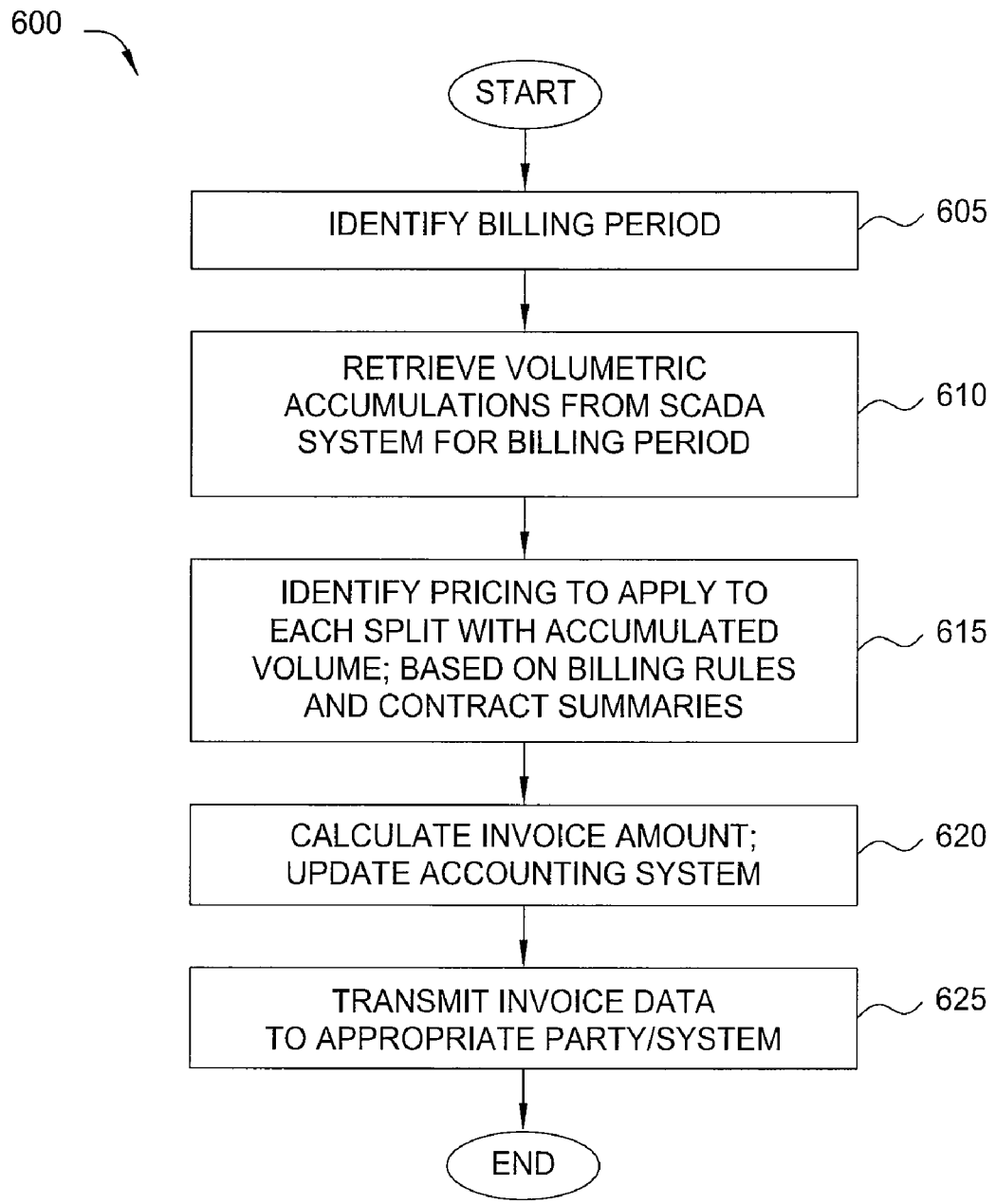
FIG. 6 illustrates a method for generating a billing amount pursuant to a supply contract in an industrial network, such as a pipeline, according to one embodiment of the invention.

FIG. 6 illustrates a method 600 for generating a billing amount pursuant to a supply contract in an industrial network, such as a pipeline, according to one embodiment of the invention. As shown, the method 600 begins at step 605 where the billing system identifies a billing period for which an invoice should be generated. The billing period may simply be a close associated with a given customer agreement (e.g., a monthly or quarterly close). Alternatively, a user may query the billing system and specify a billing period directly.

At step 610, the billing system receives the volumetric accumulations from the SCADA system for the billing period identified at step 605. The accumulations may provide a volume measurement as well as a label or characteristic of the particular volume group. For example, as was discussed relative to FIG. 4, one volume group measured a total accumulated volume delivered at an instantaneous flow rate below 400 TBD, and two others measuring volume delivered above an instantaneous flow rate of 400 TBD, further divided into volume delivered both above and below a pressure of 600 PSI.

At step 615, the billing system identifies a pricing amount to apply to each spilt with any accumulated volume. As described above, the pricing amounts may be determined from a set of billing rules derived from a contract summary associated with a given customer agreement. At step 620, the billing system calculates an invoice amount. Additionally, the billing system may update an accounting system (e.g., an accounts receivable database and/or business general ledger). Once the billing system determines an invoice amount for the billing period specified at step 605, the invoice data may be sent to the appropriate party/system (step 625). For example, the final invoice amount may be sent to an account manger with authority to approve/revise the amounts before an actual invoice is sent to a given customer. Alternatively, the billing system may transmit the invoice to the customer directly.

Figure 7:
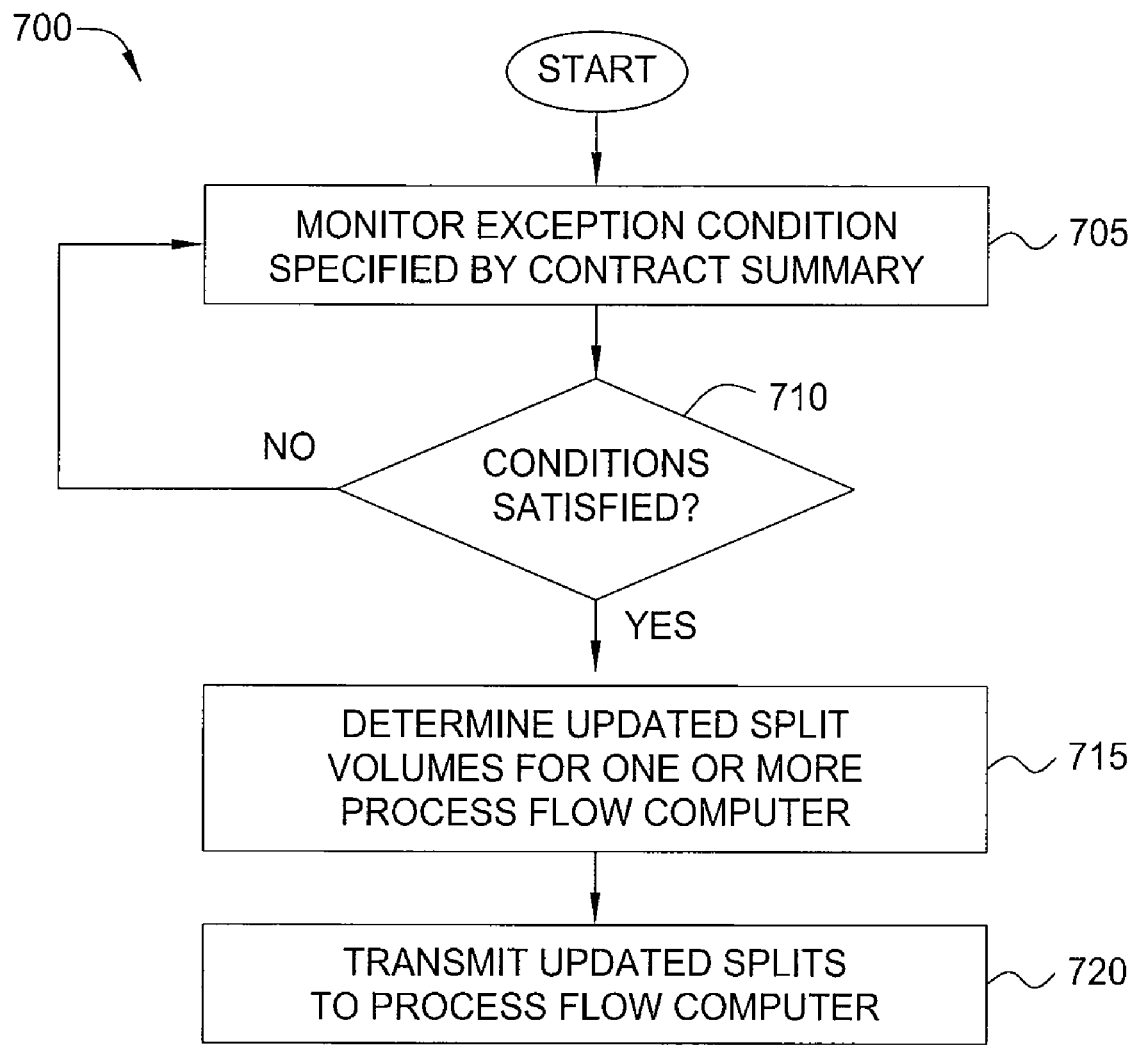
FIG. 7 illustrates a method for generating updated volumetric groups for product delivered through a large industrial system, such as a pipeline, according to one embodiment of the invention.

FIG. 7 illustrates a method 700 for generating updated volumetric groups for product delivered through a large industrial system, such as a pipeline, according to one embodiment of the invention. As shown, the method 700 begins at step 705 where the billing system monitors conditions specified in a contract summary associated with a given customer agreement. In the event conditions are satisfied (step 710), then at step 715, the billing system determines a set of updated volumes for a process flow computer a given customer site. At step 720, the billing system transmits updated groups to the appropriate process flow computer, which, in response, begins accumulating volumes using the updated volumetric groups.

Advantageously, embodiments of the invention provide a billing system for supply contrasts in an industrial network. For example, relative to a pipeline system, a process flow computer installed at each customer site may each receive instantaneous flow readings from a flow meter. The process flow computer may be configured to accumulate product volumes in different volume groups, where each volume group corresponds to a range of instantaneous flow rates. Different volume groups may be associated with different rates ultimately charged to a customer. The volume groups may be assigned by a computing system running a billing application at a pipeline operations control center. The billing application may have access to both the particular contract requirements associated with a given customer as well as external events that may relate to the volume groups assigned to the process flow computer at a given customer site. The billing application uses these factors to set the volume groups for a given customer. Thus, volume groups are set for individual customers based on the contractual arrangement between a given customer and the pipeline operator.

It will be understood, however, that many additional changes in the details, materials, steps, and arrangement of parts, which have been herein described and illustrated in order to explain the nature of the invention, may be made by those skilled in the art within the principle and scope of the invention as expressed in the appended claims. Thus, the present invention is not intended to be limited to the specific embodiments in the examples given above and/or the attached drawings.

What is claimed is:

1. A computer-implemented method for generating billing data for a supply contract in a monitored industrial network, comprising:
   identifying one or more volumetric accumulation groups for a process flow device at a customer site, wherein each volumetric accumulation group corresponds to a range of instantaneous flow rates, and wherein the customer site receives product delivered through the monitored industrial network pursuant to the supply contract;
   transmitting the volumetric accumulation groups to the process flow device, wherein the process flow device is configured to:
      receive, from a flow meter, flow data associated with of a product delivered to the customer site, relative to a sampling frequency specified for the flow meter,
      select one or more of the volumetric accumulation groups by correlating the range of instantaneous flow rates to a flow rate determined based on the flow data, and
      store a volumetric amount of the product in the selected one or more volumetric accumulation groups, the volumetric amount determined based on the flow data; and
   receiving, from the process flow device, the accumulated volume for each of the volumetric accumulation groups.

2. The method of claim 1, wherein the monitored industrial network is a pipeline.

3. The method of claim 2, wherein the flow meter measures an instantaneous flow of product delivered over the pipeline to the customer site.

4. The method of claim 1, wherein the volumetric accumulation groups are derived from the supply contract, and wherein at least two of the volumetric accumulation group are assigned different prices based on the supply contract.

5. The method of claim 4, wherein the contract summary is composed according to a formal markup language grammar and wherein the contract summary is parsed to identify the volumetric accumulation groups transmitted to the process flow device.

6. The method of claim 1, wherein the process flow device comprises one or more application specific intergraded circuit (ASICs).

7. The method of claim 1, further comprising:
   determining criteria for updating the volumetric accumulation groups has been satisfied;
   identifying one or more updated volumetric accumulation groups for the process flow device at the customer site; and
   transmitting the updated volumetric accumulation groups to the process flow device.

8. A computer-readable storage medium containing billing application, which when executed on a processor is configured to perform an operation for generating billing data for a supply contract in a monitored industrial network, the operation comprising:
   identifying one or more volumetric accumulation groups for a process flow device at a customer site, wherein each volumetric accumulation group corresponds to a range of instantaneous flow rates and wherein the customer site receives product delivered through the monitored industrial network pursuant to the supply contract;

transmitting the volumetric accumulation groups to the process flow device, wherein the process flow device is configured to:
- receive, from a flow meter, flow data associated with of a product delivered to the customer site, relative to a sampling frequency specified for the flow meter,
- select one or more of the volumetric accumulation groups by correlating the range of instantaneous flow rates to a flow rate determined based on the flow data, and
- store a volumetric amount of the product in the selected one or more volumetric accumulation groups, the volumetric amount determined based on the flow data; and receiving, from the process flow device, the accumulated volume for each of the volumetric accumulation groups.

9. The computer-readable storage medium of claim 8, wherein the monitored industrial network is a pipeline.

10. The computer-readable storage medium of claim 9, wherein the flow meter measures an instantaneous flow of product delivered over the pipeline to the customer site.

11. The computer-readable storage medium of claim 8, wherein the volumetric accumulation are derived from the supply contract, and wherein at least two of the volumetric accumulation group are assigned different prices based on the supply contract.

12. The computer-readable storage medium of claim 11, wherein the contract summary is composed according to a formal markup language grammar and wherein the contract summary is parsed to identify the volumetric accumulation group transmitted to the process flow device.

13. The computer-readable storage medium of claim 8, wherein the process flow device comprises one or more application specific intergraded circuit (ASICs).

14. The computer-readable storage medium of claim 8, wherein the operation further comprises:
- determining criteria for updating the volumetric accumulation group has been satisfied;
- identifying one or more updated volumetric accumulation group for the process flow device at the customer site; and
- transmitting the updated volumetric accumulation groups to the process flow device.

15. A system, comprising:
a processor; and
a memory storing a billing application, which when executed on a processor is configured to perform an operation for generating billing data for a supply contract in a monitored industrial network, the operation comprising:
identifying one or more volumetric accumulation groups for a process flow device at a customer site, wherein each volumetric accumulation group corresponds to a range of instantaneous flow rates and wherein the customer site receives product delivered through the monitored industrial network pursuant to the supply contract, transmitting the volumetric accumulation groups to the process flow device, wherein the process flow device is configured to:
- receive, from a flow meter, flow data associated with of a product delivered to the customer site, relative to a sampling frequency specified for the flow meter,
- select one or more of the volumetric accumulation groups by correlating the range of instantaneous flow rates to a flow rate determined based on the flow data, and
- store a volumetric amount of the product in the selected one or more volumetric accumulation groups, the volumetric amount determined based on the flow data; and receiving, from the process flow device, the accumulated volume for each of the volumetric accumulation groups.

16. The system of claim 15, wherein the monitored industrial network is a pipeline.

17. The system of claim 16, wherein the flow meter measures an instantaneous flow of product delivered over the pipeline to the customer site.

18. The system of claim 15, wherein the volumetric accumulation groups are derived from the supply contract, and wherein at least two of the volumetric accumulation group are assigned different prices based on the supply contract.

19. The system of claim 15, wherein the contract summary is composed according to a formal markup language grammar and wherein the contract summary is parsed to identify the volumetric accumulation groups transmitted to the process flow device.

20. The system of claim 15, wherein the process flow device comprises one or more application specific intergraded circuit (ASICs).

21. The system of claim 15, wherein the operation further comprises:
- determining criteria for updating the volumetric accumulation groups has been satisfied;
- identifying one or more updated volumetric accumulation groups for the process flow device at the customer site; and
- transmitting the updated volumetric accumulation groups to the process flow device.

* * * * *

UNITED STATES PATENT AND TRADEMARK OFFICE
CERTIFICATE OF CORRECTION

PATENT NO. : 8,306,884 B2
APPLICATION NO. : 12/902549
DATED : November 6, 2012
INVENTOR(S) : Elias Margonis et al.

It is certified that error appears in the above-identified patent and that said Letters Patent is hereby corrected as shown below:

Title Page

Item (73) Assignee: replace "Air Liquide Industrial U.S. LP" with --Air Liquide Large Industries U.S. LP--.

Signed and Sealed this
Fifteenth Day of October, 2013

Teresa Stanek Rea
*Deputy Director of the United States Patent and Trademark Office*